Patented Aug. 29, 1944

2,357,224

UNITED STATES PATENT OFFICE 2,357,224

PROCESS FOR THE MANUFACTURE OF ESTERS OF THE SUPRARENAL CORTICAL HORMONE SERIES

Tadeus Reichstein, Basel, Switzerland, assignor to the firm of Roche-Organon Incorporated, Nutley, N. J.

No Drawing. Application May 16, 1941, Serial No. 393,832. In Switzerland June 15, 1940

11 Claims. (Cl. 260—397.4)

It has been found that esters of the suprarenal cortical hormone series can be obtained by reacting saturated or unsaturated 21-diazo-pregnane-20-ones with anhydrous organic sulfonic acids and if desired treating the sulfonic acid esters thus obtained with salts of organic or inorganic acids.

The starting materials for the new process may be of any desired steric configuration and in addition to the said substituents contain any desired further substituents, for example free or esterified hydroxyl groups or keto groups in 3-, 6-, 11-, 12- or 17-position.

For the reaction of the diazoketones there may be used any desired anhydrous organic sulfonic acids, for instance methane-, ethane-, toluene-, benzene-, naphthalene-, etc., sulfonic acids.

The sulfonic acid esters obtained exhibit quite a remarkable reactivity, for when treated with salts of organic or inorganic acids, for example with alkali iodides, alkali bromides, tetraalkylammonium chlorides, phosphoric acid salts, metallic acylates such as alkali acetates, alkali propionates, alkali butyrates, alkali palmitates or alkali benzoates, or when treated with salts, for example with salts of crotonic acid, of phenylacetic acid, of lactic acid, of succinic acid, of phthalic acid, of alkyl carbonic acid or of alkoxy acetic acids, these sulfonic acid esters are converted into the esters of the 17-ketols with the acids used for producing the said salts.

The esters obtained according to the new, particularly advantageous process are to find use in therapeutics.

The following examples illustrate the invention, the parts being by weight:

Example 1

2 parts of $\Delta^5$-21-diazo-pregnene-3-ol-20-one-acetate are dissolved in 30 parts of absolute benzene and the solution is mixed with a solution of 2 parts of para-toluene sulfonic acid distilled in a high vacuum in 30 parts of absolute alcohol. Slight elimination of gas occurs already at room temperature which is completed by heating at 45–50° C. for 10 minutes. The solution is diluted with ether, washed with sodium carbonate solution and water, dried with sodium sulfate, evaporated, and the residue is dried in a vacuum. In the subsequent chromatography to aluminium oxide the residue is washed with benzene-pentane 1:1 until a concentrated sample of the filtrate contains no residue. The evaporated eluates are dissolved in a trace of ether, the solution is mixed with pentane and allowed to stand. 1.44 parts of colorless crystals are obtained with melt at 120–121° C. and which represent the $\Delta^5$-pregnene-3:21-diol-20-one-3-acetate-21-tolyl sulfonate.

Example 2

1 part of $\Delta^5$-21-diazo-pregnene-3-ol-20-one is treated with para-toluenesulfonic acid as described in Example 1. The desired product is obtained in the chromatography only from the portions elutriatable from benzene. Colorless crystals of melting point 123–124° C. are obtained from ether-pentane, which represent the $\Delta^5$-pregnene-3:21-diol-20-one - 21 - monotolyl sulfonate.

Example 3

0.85 part of 21-diazo-progesterone is heated to 50° C. in absolute alcohol with 1.06 parts of para-toluene-sulfonic acid distilled in a high vacuum. After 10 minutes about 6 cc. of gas are eliminated. The solution is diluted with ether, the ethereal solution is washed until neutral, dried and evaporated. The residue is recrystallized twice from ether-pentane and there is obtained 0.6 part of colorless laminae melting at 170–171° C. These represent the $\Delta^4$-pregnene-21-ol-3:20-dione-tolyl sulfonate.

Example 4

1 part of $\Delta^5$-pregnene-3:21-diol-20-one-3-acetate-21-tolyl sulfonate is dissolved in 5 parts of acetone and the solution is mixed with a solution of 1 part of sodium iodide in 7 parts of acetone. Elimination of the sodium toluenesulfonate sets in very rapidly already at room temperature. The reaction is completed by boiling for a short time. The reaction mixture is concentrated in a vacuum, mixed with water and shaken out with ether. The light-brown ether solution is washed with thiosulfate solution, sodium carbonate solution and water, dried and strongly concentrated. The crystallization which sets in spontaneously is completed by addition of pentane. 0.75 part of crystals of melting point 126–128° C. is thus obtained. The melting point may be raised to 129–131° C. by recrystallisation from ether-pentane. This $\Delta^5$-21 - iodine - pregnene-3-ol-20-one-acetate is in pure state a colorless product which is however in most cases soon colored yellow when left to lie.

Example 5

1 part of $\Delta^5$-pregnene-3:21-diol-20-one-21-monotolyl sulfonate is boiled with the solution of 3 parts of sodium bromide in 200 parts of methanol for 1 hour under reflux. The reaction mixture is then evaporated to dryness in a vacuum, the residue is mixed with water and extracted with ether. The ether solution is washed with sodium carbonate solution and water, dried and strongly concentrated. The crystallisation of $\Delta^5$-21-bromo-pregnene-3-ol-20-one which sets in is completed by addition of pentane. The product melts at 149–151° C. A small quantity of unchanged starting material may be still recovered from the mother liquor.

*Example 6*

1 part of $\Delta^5$-pregnene-3:21-diol-20-one-3-acetate-21-tolyl sulfonate is dissolved in 60 parts of acetone and after addition of 2.4 parts of tetramethyl-ammonium-chloride the solution is boiled for 2 hours in a reflux apparatus. When working up as described above there are obtained crystals which melt in the crude state at 148–154° C., but after recrystallization from little absolute alcohol at 155–156° C. These crystals represent the $\Delta^5$-21-chloro-pregnene-3-ol-20-one-acetate.

What I claim is:

1. A process for the manufacture of sulfonic acid esters, which comprises treating a member of the group consisting of saturated and unsaturated 21-diazo-pregnane-20-ones with a dry organic sulfonic acid at a temperature sufficient to cause reaction.

2. A process for the manufacture of sulfonic acid esters, which comprises treating a member of the group consisting of saturated and unsaturated 21-diazo-pregnane-20-ones with a dry organic sulfonic acid at a temperature sufficient to cause reaction and treating the resultant sulfonic acid esters with a salt of a member of the group consisting of an organic and an inorganic acid.

3. A process for the manufacture of sulfonic acid esters, which comprises treating $\Delta^5$-21-diazo-pregnene-3-ol-20-one with a dry organic sulfonic acid at a temperature sufficient to cause reaction and treating the resultant sulfonic acid ester with a salt of a member of the group consisting of an organic and an inorganic acid.

4. A process for the manufacture of sulfonic acid esters, which comprises treating $\Delta^5$-21-diazo-pregnene-3-ol-20-one with p-toluol-sulfonic acid at a temperature sufficient to cause reaction and treating the resultant sulfonic acid esters with a salt of a member of the group consisting of an organic and an inorganic acid.

5. A process for the manufacture of sulfonic acid esters, which comprises treating $\Delta^5$-21-diazo-pregnene-3-ol-20-one with p-toluol-sulfonic acid at a temperature sufficient to cause reaction and treating the resultant sulfonic acid ester with a salt of a hydrogen halide.

6. A process for the manufacture of sulfonic acid esters, which comprises treating 21-diazo-progesterone with a dry organic sulfonic acid at a temperature sufficient to cause reaction and treating the resultant sulfonic acid ester with a salt of a member of the group consisting of an organic and an inorganic acid.

7. The compounds of the formula

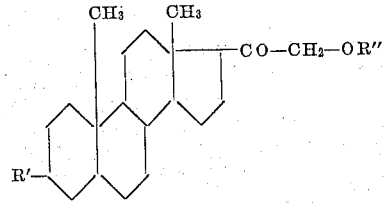

wherein R' is a member of the group consisting of O-acyl, OH, and O, the skeleton has one double bond therein, and R'' is the radical of an aromatic sulfonic acid.

8. The compounds of the formula

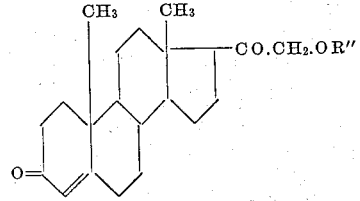

wherein R'' is the radical of an organic sulfonic acid.

9. The $\Delta^5$-pregnene-3:21-diol-20-one-21-monotolyl sulfonate melting at 123–124° C.

10. The $\Delta^4$-pregnene-21-ol-3:20-dione-tolyl sulfonate melting at 170–171° C.

11. The $\Delta^5$-pregnene-3:21-diol-20-one-3-acetate-21-tolyl sulfonate melting at 120–121° C.

TADEUS REICHSTEIN.